(12) United States Patent
Tiedemann, Jr. et al.

(10) Patent No.: US 6,873,647 B1
(45) Date of Patent: Mar. 29, 2005

(54) METHOD AND SYSTEM FOR REDUCING SYNCHRONIZATION TIME IN A CDMA WIRELESS COMMUNICATION SYSTEM

(75) Inventors: Edward G. Tiedemann, Jr., San Diego, CA (US); Daisuke Terasawa, San Diego, CA (US); Abhijit G. Shanbhag, San Diego, CA (US); Yu-Cheun Jou, San Diego, CA (US); Joseph P. Odenwalder, Del Mar, CA (US); Serge Willenegger, Onnens (CH); Sandip Sarkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/435,312

(22) Filed: Nov. 5, 1999

Related U.S. Application Data
(60) Provisional application No. 60/122,089, filed on Feb. 26, 1999.

(51) Int. Cl.[7] .............................................. H04B 1/69
(52) U.S. Cl. ...................................................... 375/145
(58) Field of Search ................................. 375/130, 137, 375/145, 146, 149; 370/203, 208, 209, 320, 335, 342, 431, 441, 311

(56) References Cited

U.S. PATENT DOCUMENTS

| | | | |
|---|---|---|---|
| 5,103,459 A | | 4/1992 | Gilhousen et al. |
| 5,778,316 A | | 7/1998 | Persson et al. |
| 5,812,543 A | * | 9/1998 | Sugita .......................... 370/335 |
| 5,930,706 A | * | 7/1999 | Raith ........................ 455/422.1 |
| 5,978,412 A | * | 11/1999 | Takai .......................... 375/200 |
| 5,982,758 A | * | 11/1999 | Hamdy ........................ 370/331 |
| 6,049,535 A | * | 4/2000 | Ozukturk et al. ........... 370/335 |
| 6,122,266 A | * | 9/2000 | Lynch ......................... 370/335 |
| 6,144,691 A | * | 11/2000 | Kenney ....................... 375/130 |
| 6,157,631 A | * | 12/2000 | Rohani ........................ 370/342 |
| 6,173,006 B1 | * | 1/2001 | Kent et al. ................... 375/145 |
| 6,246,675 B1 | * | 6/2001 | Beasley et al. .............. 370/342 |
| 6,246,886 B1 | * | 6/2001 | Oliva .......................... 455/553 |
| 6,256,501 B1 | * | 7/2001 | Tokuyama et al. .......... 455/442 |
| 6,310,871 B1 | * | 10/2001 | Kim ............................ 370/342 |
| 6,339,588 B1 | * | 1/2002 | Katsuragawa ............... 370/311 |

FOREIGN PATENT DOCUMENTS

| | | |
|---|---|---|
| EP | 0865172 | 9/1998 |

\* cited by examiner

*Primary Examiner*—Emmanuel Bayard
(74) *Attorney, Agent, or Firm*—Philip Wadsworth; Thien T. Nguyen; Roger W. Martin

(57) ABSTRACT

A method and system for generating forward link channels in a synchronous CDMA base station having a pilot pseudonoise (PN) sequence with a pilot PN sequence offset. In one embodiment the method includes the steps of generating a sync channel including a sync channel message; generating an identification channel including at least the pilot PN sequence offset; and orthogonalizing the sync channel and the identification channel. The identification channel and the sync channel are both transmitted. However, the mobile station may get the pilot PN offset from the identification channel quickly, rather than having to demodulate the entire sync channel message. The identification channel may further include an indication of the phase of the pilot PN sequence, and the epoch of the pilot PN sequence. In one embodiment, the method includes encoding the identification channel using a Golay code.

30 Claims, 5 Drawing Sheets

METHOD AND SYSTEM FOR REDUCING SYNCHRONIZATION TIME IN A CDMA WIRELESS COMMUNICATION SYSTEM

This application claims the benefit of U.S. Provisional Application No. 60/122,089, entitled "Asynchronous Operation", filed Feb. 26, 1999.

BACKGROUND OF THE INVENTION

I. Field of the Invention

The present invention relates to wireless communication systems. More particularly, the present invention relates to a novel and improved method and apparatus for reducing the mean time necessary for a mobile station to acquire and synchronize with a synchronous base station in a CDMA wireless communication system.

II. Description of the Related Art

Figure 1:
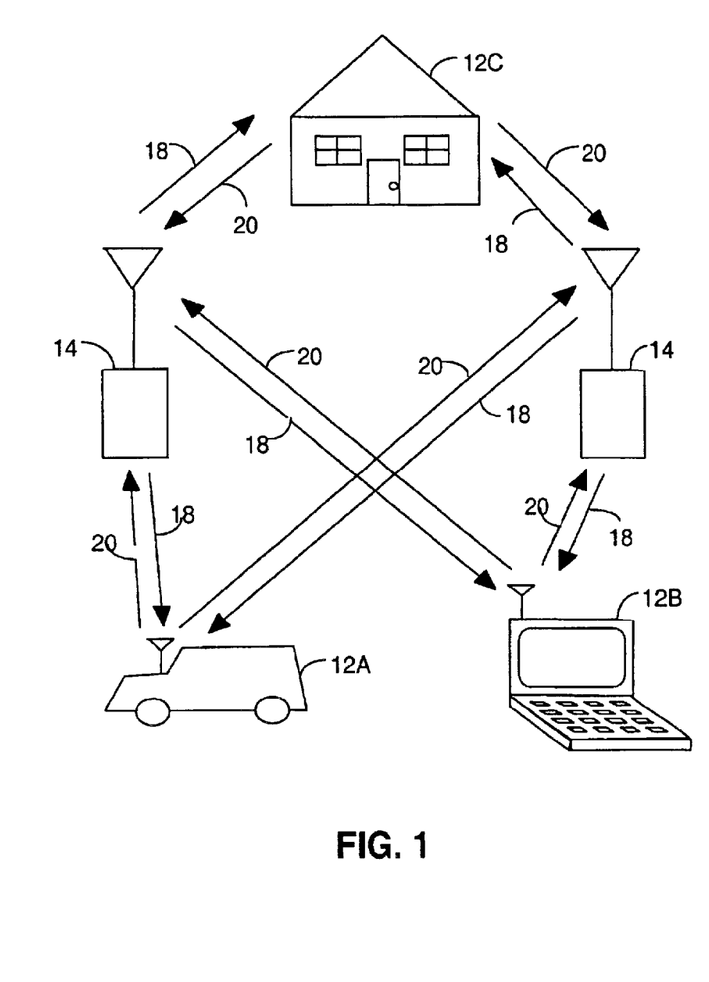
FIG. 1 is an exemplifying embodiment of a terrestrial wireless communication system.

FIG. 1 is an exemplifying embodiment of a terrestrial wireless communication system 10. FIG. 1 shows the three remote units 12A, 12B and 12C and two base stations 14. In reality, typical wireless communication systems may have many more remote units and base stations. In FIG. 1, the remote unit 12A is shown as a mobile telephone unit installed in a car. FIG. 1 also shows a portable computer remote unit 12B and the fixed location remote unit 12C such as might be found in a wireless local loop or meter reading system. In the most general embodiment, remote units may be any type of communication unit. For example, the remote units can be hand-held personal communication system units, portable data units such as personal data assistants, or fixed location data units such as meter reading equipment. FIG. 1 shows a forward link signal 18 from the base stations 14 to the remote units 12 and a reverse link signal 20 from the remote units 12 to the base stations 14.

An industry standard for a wireless system using code division multiple access (CDMA) is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here in as IS-95), the contents of which are also incorporated herein by reference. More information concerning a code division multiple access communication system is disclosed in U.S. Pat. No. 4,901, 307, entitled "SPREAD SPECTRUM MULTIPLE ACCESS COMMUNICATION SYSTEM USING SATELLITE OR TERRESTRIAL REPEATERS", assigned to the assignee of the present invention and incorporated in its entirety herein by this reference.

Third-generation CDMA wireless communications systems have also been proposed. The cdma2000 ITU-R Radio Transmission Technology (RTT) Candidate Submission proposal forwarded by the Telecommunications Industry Association (TIA) to the International Telecommunication Union (ITU) for consideration for the IMT-2000 CDMA standard is an example of such a third-generation wireless communication system. The standard for cdma2000 is given in draft versions of IS-2000 being generated by TR45 of the TIA. The cdma2000 proposal is compatible with IS-95 systems in many ways. For example, in both the cdma2000 and IS-95 systems, each base station time-synchronizes its operation with other base stations in the system. Typically, the base stations synchronize operation to a universal time reference such as Global Positioning Satellites (GPS) signaling; however, other mechanisms can be used. Based upon the synchronizing time reference, each base station in a given geographical area is assigned a sequence offset of a common pseudo noise (PN) pilot sequence. For example, according to IS-95, a PN sequence having $2^{15}$ chips and repeating every 26.66 milliseconds (ms) is transmitted by each base station in the system at one of 512 PN sequence offsets as a pilot signal. The base stations continually transmit the pilot signal which can be used by the remote units to identify the base stations as well as for other functions.

Base station time-synchronization as provided in the cdma2000 and IS-95 systems has many advantages with respect to system acquisition and handoff completion time. Synchronized base stations and time-shifted common pilot signals as discussed above permit a fast one-step correlation for system acquisition and detection of neighboring base stations. Once the mobile station has acquired one base station, it can determine system time which is the same for all neighboring synchronous base stations. In this case, there is no need to adjust the timing of each individual mobile station during a handoff between synchronous base stations. Additionally, the mobile station does not need to decode any signal from the new base station in order to obtain rough timing information prior to handing off.

Another recently-proposed 3G communication system is referred to as W-CDMA. One example of a W-CDMA system is described in the ETSI Terrestrial Radio Access (UTRA) International Telecommunications Union (ITU) Radio Transmission Technology (RTT) Candidate Submission forwarded by ETSI to the ITU for consideration for the IMT-2000 CDMA standard. The base stations in a W-CDMA system operate asynchronously. That is, the W-CDMA base stations do not all share a common universal time reference. Different base stations are not time-aligned. As a result, W-CDMA base stations employ a 3-step acquisition procedure with multiple parallel correlations in each step. In the W-CDMA system, each base station transmits a "synchronization" channel that comprises two sub-channels. The first of the two sub-channels, the primary synchronization channel, uses a primary synchronization code, $c_p$, that is common to all base stations. The second of the two sub-channels, the secondary synchronization channel, uses a cyclic set of secondary synchronization codes, $c_s$, that are not shared by other base stations that are not in the same code group. The mobile station in a W-CDMA system can acquire the synchronization channel of one or more base stations by searching for the primary synchronization code, $c_p$ of the primary synchronization channel, and then using the timing information derived from the primary synchronization channel to process the secondary synchronization channel.

Recently, a combined CDMA IMT-2000 standard has been proposed in which cdma2000-compliant equipment and W-CDMA-compliant equipment may be optionally supported by any manufacturer. Thus, it is expected that synchronous base stations of a cdma2000-compliant system will be geographically located near asynchronous base stations of a W-CDMA-compliant system. This creates a need to be able to handoff a mobile station that supports both cdma2000 and W-CDMA operation between the asynchronous base stations of a W-CDMA system and the synchronous base stations of a cdma2000 system, and vice versa.

U.S. Pat. No. 5,267,261 entitled "MOBILE STATION ASSISTED SOFT HANDOFF IN A CDMA CELLULAR COMMUNICATIONS SYSTEM," which is assigned to the assignee of the present invention and which is incorporated herein, discloses a method and system for providing communication with the remote unit through more than one base station during the handoff process. Further information concerning handoff is disclosed in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", U.S. Pat. No. 5,640,414, entitled "MOBILE STATION ASSISTED SOFT HANDOFF IN A CDMA CELLULAR COMMUNICATIONS SYSTEM", and U.S. Pat. No. 5,625,876 entitled "METHOD AND APPARATUS FOR PERFORMING HANDOFF BETWEEN SECTORS OF A COMMON BASE STATION," each of which is assigned to the assignee of the present invention and incorporated in its entirety herein by this reference. The subject matter of U.S. Pat. No. 5,625,876 concerns so-called "softer handoff." For the purposes of this document, the term "soft handoff" is intended to include both "soft handoff" and "softer handoff." U.S. Pat. No. 6,456,606, issued Sep. 24, 2002, filed Mar. 24, 1999, entitled "HANDOFF CONTROL IN AN ASYNCHRONOUS CDMA SYSTEM", assigned to the assignee of the present invention and incorporated in its entirety herein by reference, also provides additional information on handoff procedures involving both synchronous and asynchronous base stations.

Each base station is associated with a set of neighboring base stations surrounding the base station. Due to the physical proximity of the coverage areas of the neighboring base stations to the coverage area of the active base station, the remote units which are communicating with the active base station are more likely to handoff to one of the neighboring base stations than to other base stations in the system. In the IS-95 and cdma2000 systems, the base station identifies the neighboring base stations to the remote units with which it has established communication using a neighbor list identification message. The neighbor list identification message identifies a neighboring base station according to the PN sequence offset at which it transmits the pilot signal. In the IS-95 and cdma2000 systems, there is a one-to-one correspondence in a given geographical area between a base station and a PN sequence offset. In other words, two base stations operating in the same geographical area do not both use the same PN sequence offset. Thus, a base station in the IS-95 or cdma2000 system can be uniquely identified in a geographical region by its PN sequence offset.

The remote unit uses the neighbor list to limit the space over which it searches for handoff candidates. Because the searching process is so resource intensive, it is advantageous to avoid performing a search over the entire set of possible PN sequence offsets. By using the neighbor list, the remote unit can concentrate its resources on those PN sequence offsets which are most likely to correspond to useful signal paths.

A typical IS-95 or cdma2000 neighbor acquisition operation is practical so long as each base station's timing remains synchronous with respect to the others. However, in some systems such as W-CDMA, advantages are achieved by decoupling operation of the system from a synchronizing reference. For example, in a system which is deployed underground, such as in a subway system, it can be difficult to receive a universal time synchronization signal using GPS. Even where strong GPS signals are available, it is perceived as desirable in some political climates to decouple system operation from the U.S. Government GPS system. There may be other reasons for decoupling operation of the system from a synchronizing reference.

In a system where one or more of the base stations operate asynchronously with respect to other base stations in the system, the base stations cannot be readily distinguished from one another based merely upon a relative time offset (typically measured as a relative PN sequence offset) because a relative time offset between the base stations cannot be established without the use of a universal time reference. Thus, when a remote unit is in communication with an asynchronous base station, and has not been recently in communication with a synchronous base station, the remote unit is unlikely to have system time information of the synchronous base stations to a sufficient accuracy.

For example, suppose a remote unit has been in the coverage area of an asynchronous base station and is moving into the coverage area of a synchronous base station. Further suppose that the remote unit is able to detect the pilot signals of two different synchronous base stations by determining their relative PN sequence offsets. Unless the remote unit already knows system time of the synchronous base stations to a sufficient accuracy, the remote unit will be unable to determine which pilot signal is being transmitted by which base station. In other words, although the remote unit is able to distinguish that there are two different synchronous base stations due to their different relative PN sequence offsets, the remote unit is unable to determine the identity of either synchronous base station based on their pilot signals alone because the remote station does not have an absolute time reference with which to compare the two PN sequence offsets.

In a conventional IS-95 or cdma2000 system, once the forward pilot channel is acquired, the remote unit can then demodulate the forward synchronization channel. This is possible because the forward sync channel timing is such that its frame boundary is always aligned to the beginning of the PN sequence of the forward pilot channel. In other words, the forward sync channel frame boundary is always offset from system time by the same number of PN chips as the PN sequence offset of the corresponding forward pilot channel. The forward sync channel carries a sync channel message which includes overhead information such as system identification, system time, the base station's PN sequence offset, and several other items of useful information. After demodulating the sync channel message, the remote unit adjusts its internal timing according to the PN offset and system time sent in the sync channel message as described in IS-95.

Because the conventional sync channel is transmitted at a low data rate (for example, 1200 bps in IS-95), and the sync channel message contains a large amount of overhead information that must be demodulated on a frame-by-frame basis, it may be on the order of 800 milliseconds before the remote unit is able to determine the system identity of the transmitting base station via the sync channel message. This delay can undesirably affect the timing of a handoff from the asynchronous base station to the synchronous base station, particularly in a fading environment. In some instances, the delay associated with the remote unit having to determine the system identification of the target synchronous base station(s) by demodulating a conventional sync channel message would be unacceptably long, causing degradation or even dropping of a call in progress.

Thus, there is a need for an improved method and system for facilitating handoff between asynchronous and synchronous base stations that avoids the undesirable delays associated with demodulating a conventional sync channel message.

SUMMARY OF THE INVENTION

The present invention is a novel and improved method and system for generating forward link channels in a synchronous CDMA base station having a pilot pseudonoise (PN) sequence with a pilot PN sequence offset. In one embodiment the method includes the steps of generating a sync channel including a sync channel message; generating an identification channel including at least the pilot PN sequence offset; and orthogonalizing the sync channel and the identification channel. The identification channel and the sync channel are both transmitted. However, the mobile station may get the pilot PN offset from the identification channel quickly, rather than having to demodulate the entire sync channel message. The identification channel may further include an indication of the phase of the pilot PN sequence, and the epoch of the pilot PN sequence. In one embodiment, the method includes encoding the identification channel using a Golay code.

The present invention also provides a system for practicing the above-summarized method. The system includes a sync channel message generator that generates a sync channel including a sync channel message; an identification channel data generator that generates an identification channel including at least the pilot PN sequence offset; and first and second walsh coverors for orthogonalizing the sync channel and the identification channel. The system may further include an identification channel encoder for encoding the identification channel using a Golay code.

In a separate but related embodiment, an identification channel is not transmitted, but the sync channel message content is reduced. The method includes generating a reduced sync channel having a reduced sync channel message containing at least the pilot PN sequence offset; generating a broadcast channel having a broadcast channel message; and orthogonalizing the reduced sync channel and the broadcast channel. The reduced sync channel message may further include an indication of the location of a sync channel frame within the broadcast channel, and an indication of a data rate of the broadcast channel. Furthermore, in one embodiment the method includes generating a complete sync channel having a complete sync channel message when operating according to a first spreading rate; and generating the reduced sync channel having the reduced sync channel message when operating according to a second spreading rate.

The invention also includes a system for performing the method. The system includes a reduced sync channel message generator for generating a reduced sync channel having a reduced sync channel message containing at least the pilot PN sequence offset; a broadcast channel message generator for generating a broadcast channel having a broadcast channel message; and first and second walsh coverors for orthogonalizing the reduced sync channel and the broadcast channel. In one embodiment, the system further includes a sync channel message generator for generating a complete sync channel having a complete sync channel message when operating according to a first spreading rate, and wherein the reduced sync channel message generator generates the reduced sync channel when operating according to a second spreading rate.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 2:
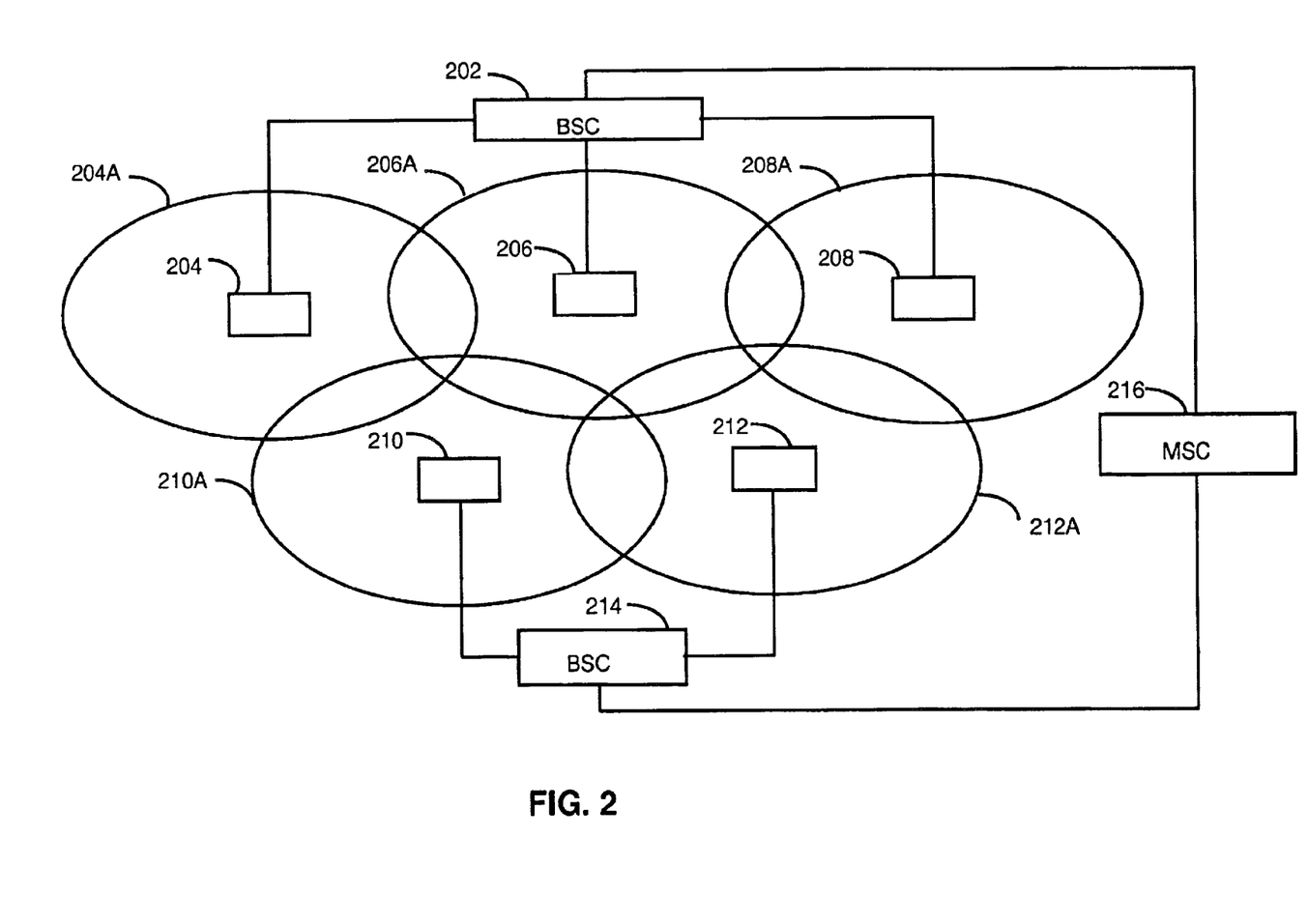
FIG. 2 is a wireless communication system including both synchronous and asynchronous base stations.

Referring now to FIG. 2, a wireless communication system is illustrated in which both synchronous and asynchronous base stations are illustrated. A Mobile Switching Center (MSC) 216 may be coupled to the Public Switched Telephone Network (PSTN) (not shown). MSC 216 is also coupled to two Base Station Controllers (BSC) 202 and 214. BSC 202 is illustrated as being coupled to three asynchronous base stations 204, 206, and 208, with geographical coverage areas (sometimes referred to as "cells") 204A, 206A, and 208A, respectively. BSC 214 is illustrated as being coupled to two synchronous base stations 210 and 212, with geographical coverage areas 210A and 212A, respectively. As can be seen from FIG. 2, there is significant overlap in the geographical coverage areas of the respective asynchronous and synchronous base stations. It is in these overlapping regions that handoff of a remote unit is expected and in which the present invention provides significant advantages. It is understood that there may be more or fewer synchronous base stations and asynchronous base stations than are shown in the example illustration of FIG. 2. Additionally, it is understood that BSC 202 and BSC 214 may not both be connected to the same MSC 216, but rather may be connected to independent MSCs or other network entities that are in turn interconnected by the PSTN (not shown).

Each of the synchronous base stations 210 and 212 transmits a pilot channel as is known in the art in accordance with either IS-95 or cdma2000. In addition, each synchronous base station 210 and 212 transmits one or more system overhead channels. For example, synchronous base stations 210 and 212 may transmit a synchronization channel and/or one or more broadcast channels to convey timing, paging and other related overhead information to the remote unit in accordance with either IS-95 or cdma2000. A simplified timing diagram of certain ones of the forward link channels transmitted by synchronous base stations 210 and 212 is shown in FIG. 3.

Figure 3:
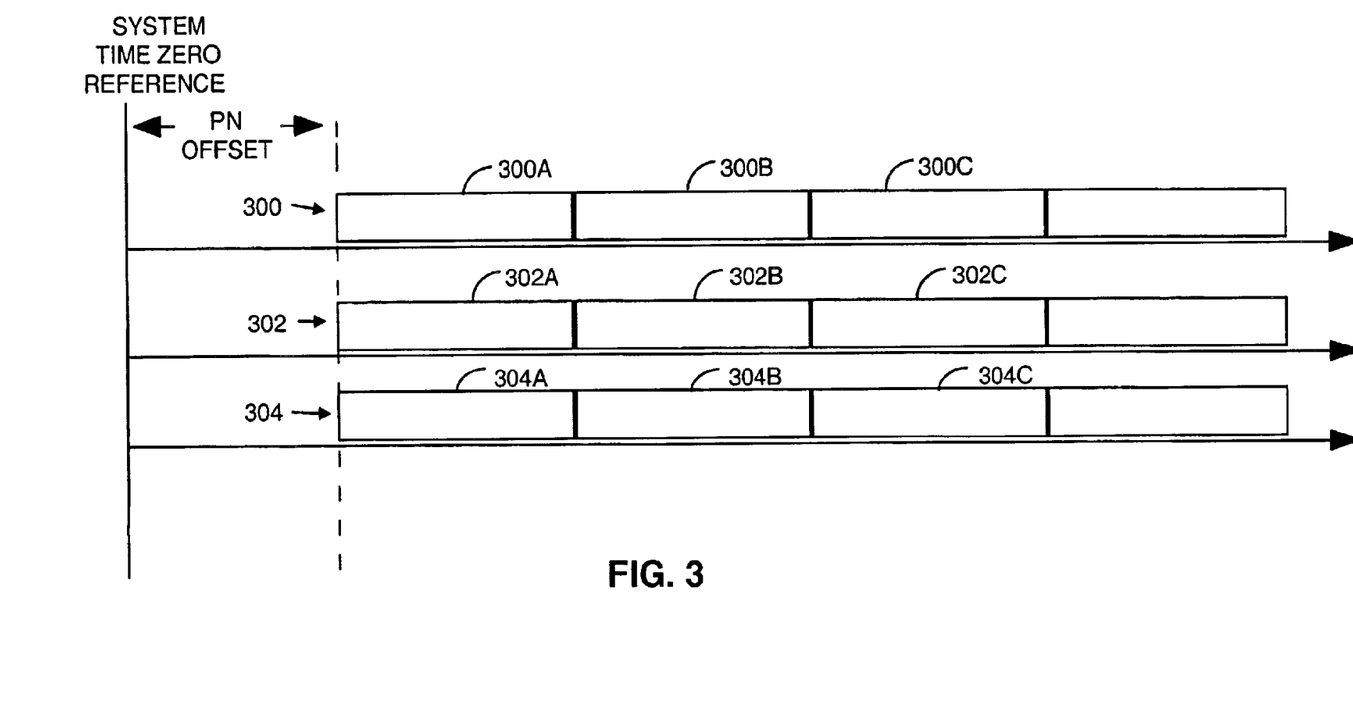
FIG. 3 is a simplified timing diagram of certain ones of the forward link channels transmitted by synchronous base stations of the present invention.

In FIG. 3, three separate forward link channels are shown, a pilot channel 300, a sync channel 302, and an identification (ID) channel 304. Pilot channel 300 may be a conventional pilot channel according to IS-95. Pilot channel 300 is transmitted by synchronous base stations 210 and 212 with different PN offsets from the system time zero reference. For convenience of illustration, pilot channel 300 may be broken down into a continuous repetition of frames 300A, 300B, 300C. Sync channel 302 may be a conventional synchronization channel according to IS-95. Sync channel 302 is transmitted with the beginning of a sync channel frame being time-aligned with the pilot channel 300, according to the same PN offset. For convenience of illustration, sync channel 302 may be broken down into a continuous repetition of frames 302A, 302B, 302C.

ID channel 304 is also shown in FIG. 3 as being time-aligned with the PN offset of the pilot channel 300. However, ID channel 304 is not a conventional IS-95 channel. Preferably, ID channel 304 is transmitted by synchronous base stations 210 and 212 in addition to the conventional pilot channel 300 and conventional sync channel 302. ID channel 304 is also preferably covered with a different Walsh code than pilot channel 300 or sync channel 302 in order to maintain orthogonality of the forward channels. However, it is understood that the ID channel 304 does not necessarily need to be orthogonal to the remaining overhead channels. For convenience of illustration, ID channel 304 may be broken down into a continuous repetition of frames 304A, 304B, 304C which are aligned in time with the PN sequence of the pilot channel 300.

The ID channel 304 is used to improve handoffs from asynchronous base stations 204, 206, 208 to synchronous base stations 210, 212. In particular, the ID channel 304 aids a mobile station in determining the pilot PN offset, and therefore the identity and timing of the target synchronous base station 210 or 212 to which it is handing off. As described above, the conventional sync channel 302 contains a large amount of information in addition to the pilot PN offset of the transmitting base station. None of this additional information is as immediately critical to the mobile station during handoff from an asynchronous base station to a synchronous base station as the pilot PN offset. Thus, in the embodiment of FIG. 3, ID channel 304 contains as little information as necessary for the base station to rapidly determine the pilot PN offset of the transmitting base station. For example, in one embodiment of the present invention, the ID channel 304 contains at least the 9-bit pilot PN offset. The ID channel 304 may also contain the 2-bit phase of the pilot PN sequence in 80 ms, and also a 1-bit even/odd indication of the 80 ms epoch of the pilot PN sequence. These additional fields allow the mobile station to determine the PN long code state. With this information, the mobile station can derive system time and synchronize to the transmitting base station's timing.

In the exemplary embodiment, the ID channel 304 is Golay encoded. For example, in the embodiment that has 12 bits (9 pilot PN offset, plus 2 phase, plus 1 even/odd), the ID channel 304 uses a 24 bit (24, 12) Golay code word. Golay codes are well known in the art as being robust, efficient error correcting codes and will not be discussed in detail herein. Example Golay coding and decoding techniques are given in the book "Error Control Coding: Fundamentals and Applications", by Shu Lin and Daniel J. Costello, Jr., ISBN 0-13-283796-X. However, other error-correcting coding techniques such as convolutional encoding or other techniques well known in the art may be used for the ID channel 304 without departing from the present invention.

Each ID channel frame 304A, 304B, 304C may contain one or more code words with each code word containing the pilot PN offset, and optionally the other information described above. The ID channel 304 preferably is continuously repeated. The continuous repetition allows a mobile station that did not collect sufficient energy during the duration of a single code word to combine energy from multiple consecutive code words in order to decode the code word and recover the pilot PN offset. In one embodiment of the present invention, only those synchronous base stations 210, 212 that have at least one asynchronous base station 204, 206, 208 as a neighbor would transmit the ID channel 304.

Figure 4:
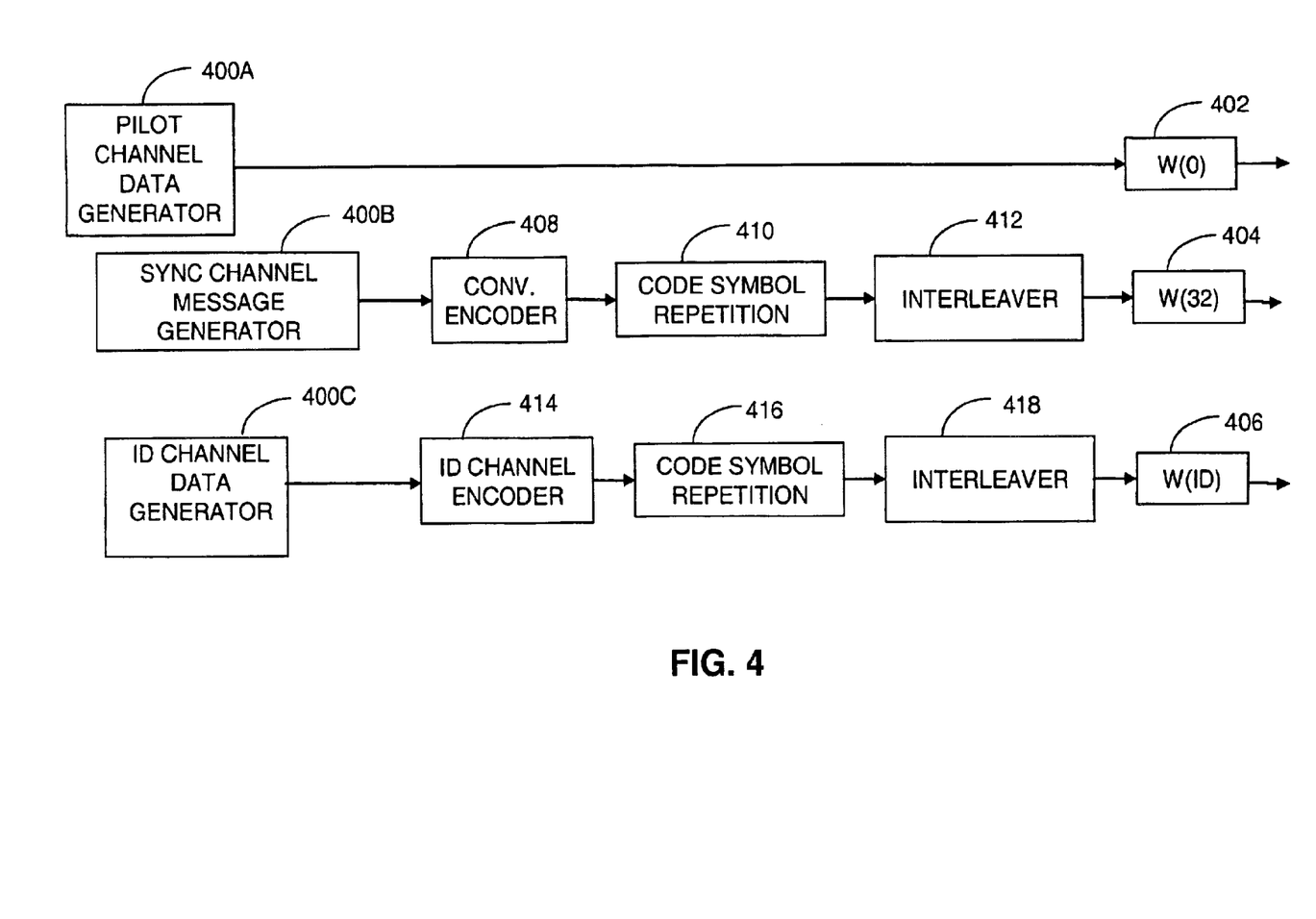
FIG. 4 is a functional block diagram of selected parts of a CDMA modulator having simultaneous transmission of a pilot channel, a conventional sync channel and a separate ID channel.

FIG. 4 illustrates a block diagram of selected parts of a CDMA modulator having simultaneous transmission of a pilot channel, a conventional sync channel, and a separate ID channel. It is understood that not all portions of the modulator have been shown, but only those that are relevant to teaching the present invention. As known in the art, the pilot channel is a sequence of all logical zeros that is covered by the Walsh function W(0) ("W(0)"). As shown in FIG. 4, a pilot channel data generator 400A generates a stream of all zeros, which is thereafter covered by W(0) in Walsh coveror 402. The conventional sync channel message is generated by sync channel message generator 400B, and is convolutionally encoded in convolutional encoder 408. In the preferred embodiment, the convolutional encoder 408 may be either a rate one-half or rate one-third convolutional encoder, depending on the desired resultant data rate, and having a constraint length of nine. Each encoded symbol is repeated in symbol repeater 410. The amount of repetition is also dependent on the desired resultant data rate, but perferably is a factor of 1x or 2x. Interleaver 412 block interleaves the repeated code symbols according to well known interleaver formats. The size of interleaver 412 may also be dependent on data rate. The sync channel is then covered with Walsh function 32 ("W(32)") in Walsh coveror 404. The ID channel data, which contains at a minimum the pilot PN offset, is generated by ID channel generator 400C and encoded by ID channel encoder 414. ID channel encoder 414 may be a Golay encoder, or other encoder such as a convolutional encoder similar to convolutional encoder 408. The ID channel code symbols are repeated in symbol repeater 416, and interleaved in interleaver 418. The amount of code symbol repetition and the size of the interleaver 418 are dependent on the numerology of the data rate and could vary from no repetition to 3x (each symbol repeated three times). The ID channel is then covered by a Walsh function different than the pilot channel (W(0)) or the sync channel W(32). It should be noted that pilot channel data generator 400A, sync channel message generator 400B, and ID channel data generator 400C may be integrated into a single processor or ASIC programmed as described herein. Indeed, all the functional blocks represented in FIG. 4 may be integrated onto a single ASIC.

In another embodiment of the present invention, a separate ID channel 304 is not transmitted. Instead, under certain conditions, the information on the sync channel 302 is reduced to decrease the amount of time necessary for the mobile station to obtain the pilot PN offset of the transmitting base station. This second embodiment will be disclosed with reference to an exemplary cdma 2000 system.

This alternate embodiment provides a more efficient structure for the sync channel message that may be used when the base station is transmitting at high data rates. In this alternate embodiment, several fields that would otherwise be part of the sync channel message are moved to another broadcast channel so that the sync channel message can be significantly shortened. This leads to a shorter "boot-up" time within the mobile station after acquisition with no previous information on system time. Later, the mobile station may then read the less critical information on the separate broadcast channel.

The sync channel in a cdma 2000 system operates at a data rate of 1200 bps for both spreading rates 1 (1.2288 mcps) and 3 (3.6864 mcps). The sync channel transmits information specific to the base station and needed by the mobile station to access the system, as well as timing fields for providing an accurate synchronized clock in the mobile station. After a sync channel message is formed, it is segmented into 31-bit groups and sent in a sync channel frame comprising a 1-bit start of message (SOM) field, and 31 bits of sync channel frame body. Three sync channel frames are combined to form a sync channel superframe of length 80 ms (96 bits). A CRC of 30 bits is also added. If the sync channel messages are less than an integer multiple of 93 bits (excluding SOM bits), they are padded with pad bits set to zero at the end of the message.

The fields in a conventional cdma 2000 sync channel message (for the first implementation version) are indicated in TABLE I below:

TABLE I

Conventional Sync Channel Message

| Field | Length (bits) |
|---|---|
| MSG_TYPE | 8 |
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| CDMA_FREQ | 11 |
| EXT_CDMA_FREQ | 11 |
| OTD_MODE | 2 |

Thus, from TABLE I, the conventional sync channel message body has about 180 bits, plus 30 bits of CRC, plus SOM bits. To this, padding bits are added, resulting in a message that is 3 superframes long. Since the long code state (LC_STATE) indicated by the sync channel message is 320 ms after the end of the sync channel message, it can be seen that the maximum boot up time from pilot acquisition until the mobile station obtains the long code state is 800 ms, assuming that the sync channel message is received error-free. For example, if the sync channel message is 240 ms long, then it may be up to 240 ms for the mobile station to receive the first start of message (SOM) bit of the sync channel message. Assuming it takes 240 ms to then decode the sync channel message, and 320 ms until the long code state is loaded by the mobile station, the total delay could be about 800 ms. As stated in the background above, this will be too long if a mobile station is being handed off from an asynchronous base station to a synchronous base station with a call in progress.

Thus, this alternate embodiment of the present invention includes transferring many of the fields of TABLE I to a separate broadcast channel, thereby shortening the sync channel message significantly. Specifically, under certain circumstances (discussed in more detail below), the sync channel message is reduced to the fields listed in TABLE II below:

TABLE II

Reduced Sync Channel Message

| Field | Length (Bits) |
|---|---|
| LOC | 3 |
| PILOT_PN | 9 |
| BRAT | 2 |
| OTD_MODE | 2 |

The LOC field represents the location of the sync channel frame (of length 26.66 ms in the preferred embodiment) within a frame time unit of 160 ms. The BRAT field indicates the data rate of the broadcast channel to which the other fields from TABLE I have been transferred. OTD_MODE is an indicator of the orthogonal transmit diversity mode of the transmitting base station. Orthogonal transmit diversity is a forward link transmission method that distributes forward link channel symbols among multiple antennas and spreads the symbols with a unique Walsh or quasi-orthogonal function associated with each antenna. Together, these three fields provide the mobile station with enough information to quickly locate and demodulate the fields that have been transferred to the separate broadcast channel. PILOT_PN is the pilot PN offset of the transmitting base station. As previously stated, knowing the pilot PN offset is necessary to determine the identity and timing of the transmitting base station if the system time of the synchronous system is not already known.

Figure 5:
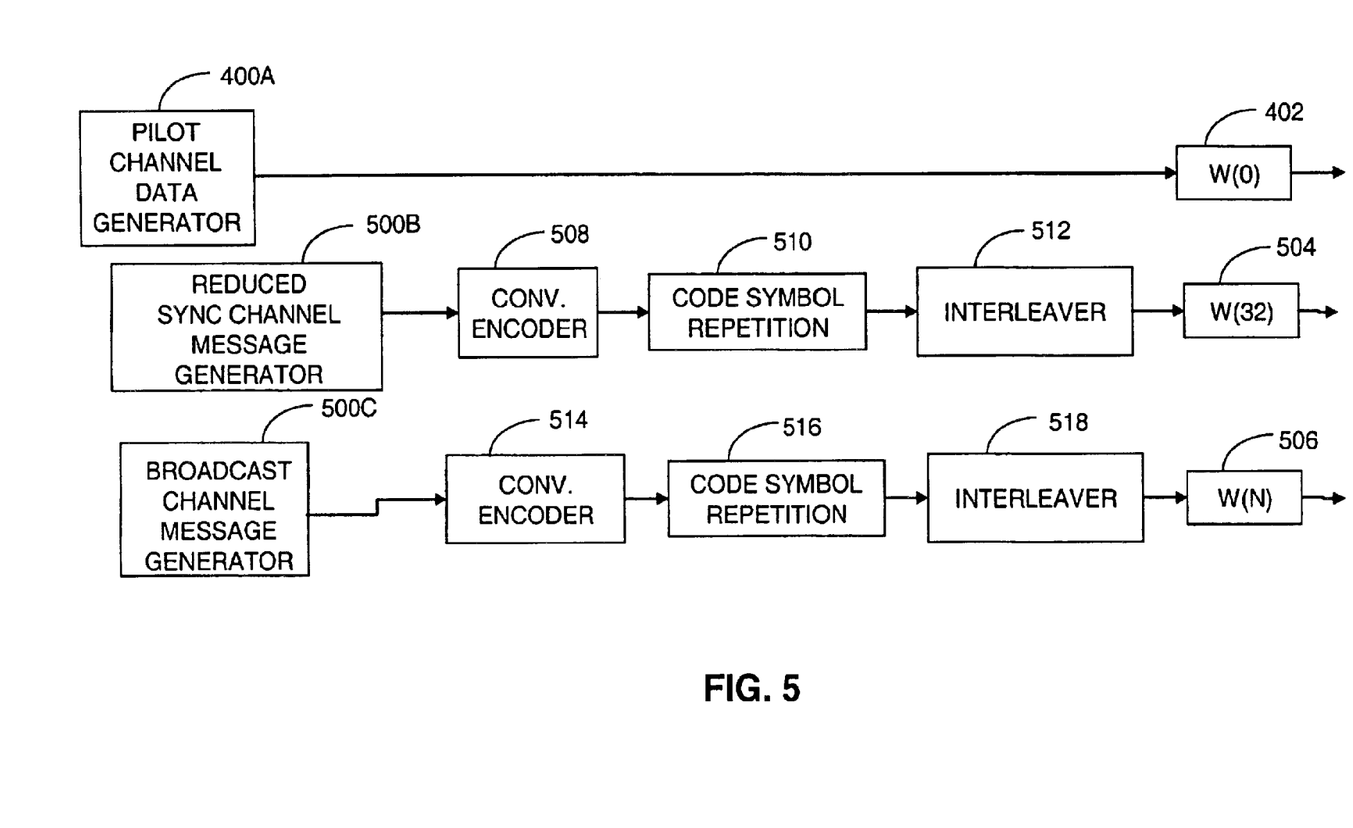
FIG. 5 is a block diagram of selected parts of a CDMA modulator that simultaneously transmits a pilot channel, a reduced sync channel, and a broadcast channel.

FIG. 5 illustrates a block diagram of selected parts of a CDMA modulator that simultaneously transmits a pilot channel, a reduced sync channel, and a broadcast channel. It is understood that not all portions of the modulator have been illustrated, but only those that are relevant to the teaching of the present invention. Pilot channel data generator 400A and Walsh coveror 402 are the same as shown in FIG. 4. Reduced sync channel message generator 500B generates the reduced sync channel message shown in TABLE II above. Other combinations of data fields, other than those shown in TABLE II above, may be substituted without departing from the present invention. For example, the field lengths may be different. The total number of bits may be different, and may include padding bits. The reduced sync channel message generator 500B passes the reduced sync channel message to convolutional encoder 508, where it is convolutionally encoded according to a format determined by the numerology of the spreading rate. Preferably, the encoding rate is either one-half or one-third, with a constraint length of nine. The code symbols are then repeated in code symbol repeater 510. The amount of repetition also depends on the desired spreading rate. Preferably, each symbol is repeated two times or four times. If the reduced sync channel message generated by reduced sync channel message generator 500B was thirty-two bits at 1200 bps, and encoded by a rate one-third convolutional encoder, and repeated four times, the resulting reduced sync channel frame would be 26.667 ms in duration.

The repeated code symbols are interleaved by interleaver 512 according to a predetermined interleaving format. Preferably, the interleaving format is a block interleaver of 96 code symbol duration. This provides flexibility in the mobile station to the extent that the mobile station need not demodulate an entire sync channel frame (26.667 ms) of data to obtain the reduced sync channel message in its entirety. The interleaved symbols are then covered with the Walsh function W(32) in walsh coveror 504. Note that this is the same Walsh function normally reserved for the conventional sync channel in an IS-95 or cdma 2000 system.

The reduced sync channel message, in the above example, is repeated 4 times within the sync channel frame. If the mobile station receives sufficient $E_b/N_t$, the mobile station may demodulate the sync channel message with high reliability after demodulating only a fraction (one-quarter, one-half, or three-quarters) of the sync channel frame. Furthermore, it is advantageous to have the entire reduced sync channel message within one frame because if the sync channel message spans multiple frames and just one frame is in deep fade, the mobile station may need to demodulate the entire message anew, further increasing the boot-up time.

With the above structure for the reduced sync channel message, the effective $E_b/N_t$ over the 26.667 ms sync channel frame at the mobile station is about 14.9 dB. Thus, the mobile station is likely to read the sync channel message within a fraction of the sync channel frame. Even so, the mean time until the mobile station can begin to demodulate the broadcast channel, assuming that the mobile station takes an entire sync channel frame of 26.667 ms to decode the reduced sync channel message is about 56.667 ms. This corresponds to a savings of about 620 ms in mean boot-up time—that is, mean time to determine the pilot PN offset sufficient to uniquely identify the transmitting base station and begin to demodulate the broadcast channel.

The broadcast channel message generator 500C generates a broadcast channel message that includes the fields from TABLE I that were not listed in TABLE II. The message is convolutionally encoded in convolutional encoder 514, the code symbols are repeated in symbol repeater 516, and the repeated code symbols interleaved in interleaver 518. The broadcast channel is then covered with a Walsh function ("W(N)") different from W(0) or W(32) in Walsh coveror 506 in order to maintain orthogonality with the pilot and sync channels. Of course, it is understood that different fields other than those listed in TABLE I may be transmitted on the broadcast channel without departing from the present invention.

In another embodiment of the present invention, the reduced sync channel message is transmitted only in those base stations that have asynchronous neighbors. In yet another embodiment of the present invention, the reduced sync channel message is only transmitted when the base station is operating at certain spreading rates. For example, in one embodiment, the base station only transmits the reduced sync channel message when operating at a spreading rate of 3.6864 mcps (Spreading Rate 3 for direct sequence spreading in cdma 2000), and instead transmits the conventional sync channel message when operating at a spreading rate of 1.2288 mcps (Spreading Rate 1 for direct sequence spreading in cdma 2000). Thus, for spreading rate 1, the conventional sync channel message would begin at the start of a sync channel superframe, and span 3 superframes. However, for spreading rate 3, the reduced sync channel message would begin at the start of a sync channel frame and would be repeated four times in a single sync channel frame of 26.667 ms. Similarly, the broadcast channel would only carry the "extra" fields from the sync channel when operating at spreading rate 3, and would carry a conventional broadcast channel message when operating at spreading rate 1.

It should be noted that the embodiments of FIG. 4 and FIG. 5 are merely exemplary of the present invention, and other combinations of "ID channels" with one or more "sync channels" or "broadcast channels" may be implemented by one of ordinary skill in the art using the teachings herein. For example, different information other than that shown in the above tables may be transmitted, or the same information or a subset thereof may be divided differently among the channels taught herein. Futhermore, it should be noted that the present invention is intended to encompass all combinations of "ID channels" or "reduced sync channels" with "conventional sync channels", or "broadcast channels".

It should be further understood that the two examples given herein (FIG. 4 and FIG. 5) may be viewed as separate species of the same generic invention described herein. Specifically, both embodiments are directed to a method and system for generating an overhead message and overhead channels that significantly reduce the time necessary for a mobile station to determine the identity and timing of a synchronous base station in a CDMA system according to its pilot PN offset. The embodiment of FIG. 4 applies directly to the overlaying of a new ID channel to an existing IS-95-based system. The embodiment of FIG. 5 applies directly to replacing the conventional sync channel with a reduced sync channel and moving the extra fields to the broadcast channel, which would be advantageous for the 3x DS mode of a cdma2000 system.

Although the present invention has been disclosed herein in an exemplary cdma 2000 or IS-95 compliant system, it is understood that the principles described herein may be advantageously applied to other systems in which the base stations are uniquely identified by their pilot PN offset. It should also be noted that although FIGS. 4 and 5 illustrate separate functional blocks, these blocks may be advantageously integrated onto one or more ASICs or DSPs.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for generating forward link channel signals by a CDMA base station comprising:

generating a sync channel signal carrying a sync channel message capable of including at least a first pilot PN offset indicator;

generating an identification channel signal carrying at least a second pilot PN sequence offset indicator, wherein the identification channel allows faster decoding of the pilot PN offset by a receiver than the sync channel allows; and orthogonalizing said sync channel signal and said identification channel signal for said transmitting said forward link channel signals.

2. The method of claim 1 wherein said identification channel signal further includes an indication of a phase of a pilot PN sequence.

3. The method of claim 2 wherein said identification channel signal further includes an indication of an epoch of said pilot PN sequence.

4. The method of claim 1 further comprising encoding said identification channel signal using a Golay code.

5. The method of claim 3 further comprising encoding said identification channel signal using a Golay code.

6. A system for generating forward link channel signals by a CDMA base station comprising:

a sync channel message generator that generates a sync channel signal carrying a sync channel message capable of including at least a first pilot PN offset indicator;

an identification channel data generator that generates an identification channel signal carrying at least a second pilot PN sequence offset indicator, wherein the identification channel allows faster decoding of the pilot PN offset by a receiver than the sync channel allows; and first and second walsh coverors for orthogonalizing said sync channel signal and said identification channel signal for said transmitting said forward link channel signals.

7. The system of claim 6 wherein said identification channel signal further includes an indication of a phase of a pilot PN sequence.

8. The system of claim 7 wherein said identification channel signal further includes an indication of an epoch of said pilot PN sequence.

9. The system of claim 6 further comprising an identification channel encoder for encoding said identification channel signal using a Golay code.

10. The system of claim 8 further comprising an identification channel encoder for encoding said identification channel signal using a Golay code.

11. A method for generating forward link channel signals by a CDMA base station, comprising:
    generating a reduced sync channel signal having a reduced sync channel message including at least a pilot PN sequence offset indicator;
    generating a broadcast channel signal having a broadcast channel message; and
    orthogonalizing said reduced sync channel signal and said broadcast channel signal.

12. The method of claim 11 wherein said reduced sync channel message further includes an indication of a location of a sync channel frame within said broadcast channel signal.

13. The method of claim 12 wherein said reduced sync channel message further includes an indication of a data rate of said broadcast channel signal.

14. The method of claim 11 further comprising:
    generating a complete sync channel signal having a complete sync channel message when operating according to a first spreading rate; and
    generating said reduced sync channel signal having said reduced sync channel message when operating according to a second spreading rate.

15. A system for generating forward link channel signals by a CDMA base station, comprising:
    a reduced sync channel message generator for generating a reduced sync channel signal having a reduced sync channel message including at least a pilot PN sequence offset indicator;
    a broadcast channel message generator for generating a broadcast channel signal having a broadcast channel message; and
    first and second walsh coverors for orthogonalizing said reduced sync channel signal and said broadcast channel signal.

16. The system of claim 15 wherein said reduced sync channel message further includes an indication of a location of a sync channel frame within said broadcast channel signal.

17. The system of claim 16 wherein said reduced sync channel message further includes an indication of a data rate of said broadcast channel signal.

18. The system of claim 15 further comprising a sync channel message generator for generating a complete sync channel signal having a complete sync channel message when operating according to a first spreading rate, and wherein said reduced sync channel message generator generates said reduced sync channel signal when operating according to a second spreading rate.

19. A system for transmitting forward link channel signals by a CDMA base station comprising:
    means for generating a sync channel signal carrying a sync channel message capable of including at least a first pilot PN offset indicator;
    means for generating an identification channel signal carrying at least a second pilot PN sequence offset indicator, wherein the identification channel allows faster decoding of the pilot PN offset be a receiver than the sync channel allows; and
    means for orthogonalizing said sync channel signal and said identification channel signal for said transmitting said forward link channel signals.

20. The system of claim 19 wherein said means for generating an identification channel signal further includes means for indicating a phase of a pilot PN sequence.

21. The system of claim 20 wherein said means for generating an identification channel signal further includes means for indicating an epoch of said pilot PN sequence.

22. The system of claim 19 further comprising means for encoding said identification channel signal using a Golay code.

23. The system of claim 21 further comprising means for encoding said identification channel signal using a Golay code.

24. A system for generating forward link channel signals by a synchronous CDMA base station comprising:
    means for generating a reduced sync channel signal having a reduced sync channel message including at least a pilot PN sequence offset indicator;
    means for generating a broadcast channel signal having a broadcast channel message; and
    means for orthogonalizing said reduced sync channel signal and said broadcast channel signal.

25. A method for receiving forward link signals comprising:
    receiving a signal containing a first orthogonal component corresponding to a sync channel signal and a second orthogonal component corresponding to an identification channel signal;
    decovering the identification channel signal by applying a first orthogonal cover;
    decovering the sync channel signal by applying a second orthogonal cover;
    decoding the identification channel signal to access a first pilot PN offset indicator; and
    decoding the sync channel signal to access a sync channel message, wherein the sync channel message is capable of carrying a second pilot PN offset indicator, and further wherein the first pilot PN offset indicator is more quickly decodable than the second pilot PN offset indicator.

26. An apparatus for receiving forward link signals comprising:
    a receiver unit that receives a signal containing a first orthogonal component corresponding to a sync channel signal and a second orthogonal component corresponding to an identification channel signal;
    a first decoverer that decovers the identification channel signal by applying a first orthogonal cover;
    a second decoverer that decovers the sync channel signal by applying a second orthogonal cover;
    a first decoder that decodes the identification channel signal to access a first pilot PN offset indicator; and
    a second decoder that decodes the sync channel signal to access a sync channel message, wherein the sync channel message is capable of carrying a second pilot PN offset indicator, and further wherein the first pilot PN offset indicator is more quickly decodable than the second pilot PN offset indicator.

27. A method for receiving forward link signals comprising:

receiving a signal containing a first orthogonal component corresponding to a reduced sync channel signal and a second orthogonal component corresponding to a broadcast channel signal;

decovering the reduced sync channel signal by applying a first orthogonal cover;

decovering the broadcast channel signal by applying a second orthogonal cover;

decoding the reduced sync signal to access a first pilot PN offset indicator; and decoding the broadcast channel signal to access a broadcast channel message.

28. An apparatus for receiving forward link signals comprising:

a receiver unit that receives a signal containing a first orthogonal component corresponding to a reduced sync channel signal and a second orthogonal component corresponding to an broadcast channel signal;

a first decoverer that decovers the reduced sync channel signal by applying a first orthogonal cover;

a second decoverer that decovers the broadcast channel signal by applying a second orthogonal cover, a first decoder that decodes the reduced sync signal to access a first pilot PN offset indicator; and a second decoder that decodes the broadcast channel signal to access a broadcast channel message.

29. An apparatus for receiving forward link signals comprising:

means for receiving a signal containing a first orthogonal component corresponding to a sync channel signal and a second orthogonal component corresponding to an identification channel signal;

a means for decovering the identification channel signal by applying a first orthogonal cover;

a means for decovering the sync channel signal by applying a second orthogonal cover;

a means for decoding the identification channel signal to access a first pilot PN offset indicator; and a means for decoding the sync channel signal to access a sync channel message, wherein the sync channel message is capable of carrying a second pilot PN offset indicator, and further wherein the first pilot PN offset indicator is more quickly decodable than the second pilot PN offset indicator.

30. An apparatus for receiving forward link signals comprising:

a means for receiving a signal containing a first orthogonal component corresponding to a reduced sync channel signal and a second orthogonal component corresponding to an broadcast channel signal;

a means for decovering the reduced sync channel signal by applying a first orthogonal cover;

a means for decovering that decovers the broadcast channel signal by applying a second orthogonal cover;

a first decoder that decodes the reduced sync signal to access a first pilot PN offset indicator; and a second decoder that decodes the broadcast channel signal to access a broadcast channel message.

* * * * *